L. E. HAYNES.
COILING DEVICE.
APPLICATION FILED JUNE 23, 1914.

1,140,980.

Patented May 25, 1915.

WITNESSES

INVENTOR
Lorenzo E. Haynes
BY
ATTORNEYS

UNITED STATES PATENT OFFICE.

LORENZO E. HAYNES, OF SALT LAKE CITY, UTAH.

COILING DEVICE.

1,140,980.　　　　Specification of Letters Patent.　　Patented May 25, 1915.

Application filed June 23, 1914. Serial No. 846,907.

*To all whom it may concern:*

Be it known that I, LORENZO E. HAYNES, a citizen of the United States, and a resident of Salt Lake City, in the county of Salt Lake and State of Utah, have invented a new and Improved Coiling Device, of which the following is a full, clear, and exact description.

My invention is more particularly applicable to the flexible conductor or cord connected with the receiver of a telephone.

The object of my invention is to provide a novel means to automatically coil the said cord or other flexible element to which the device is applied and holds the coil with its convolutions in close relation, the arrangement permitting the cord to approach a straight form by extension in the line of its axis or approximately so in response to a pull thereon.

In carrying out my invention in practice, the coiling device is formed of a sinuous elongated element such as a sinuous wire, which is given the form of a coiled spring, the sinuosities of the wire serving to hold the cord to the spring. The convolutions of the spring, as such, serve to maintain the cord in the form of a coil in which the convolutions follow and conform to the said convolutions of the spring. Means is provided for fixedly securing one end of the spring to the cord, and for attaching the other end of the spring to a relatively fixed support.

Reference is to be had to the accompanying drawings forming a part of this specification in which similar characters of reference indicate corresponding parts in both views.

Figure 1:
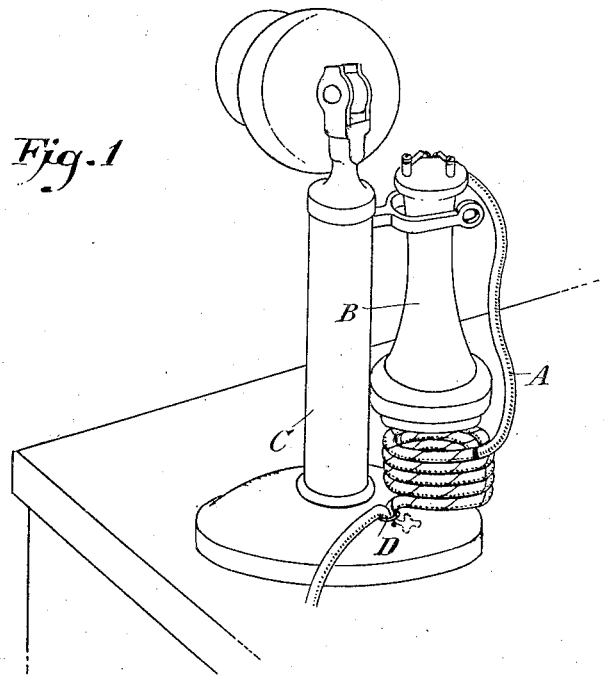
Figure 2:
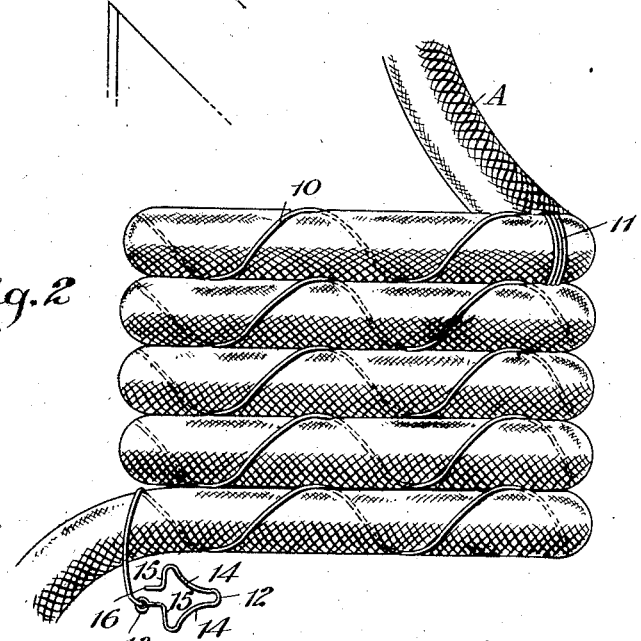

Figure 1 is a perspective view of a telephone having my invention applied to the cord of the receiver; and Fig. 2 is an enlarged side elevation showing a portion of the cord with my improved coiling device applied thereto.

The drawing shows the coiling device applied to a cord A of the receiver B of a telephone C.

The body of the coiling device consists of a coiled spring 10 which is formed of a sinuous wire, the sinuosities of which are desirably formed to present lateral convolutions that wind about the cord A, or other flexible element to which the device is applied. The coiled spring is fastened at one end 11 to the cord, preferably by providing an untempered portion of the wire which may be tightly wound in close coils around the cord. At the opposite end of the coiled spring a fastener device designated generally by the numeral 12 is provided, of a character to enter the cord hole D in the base of the telephone. Said device, which may be pivoted as at 13 to the adjacent end of the wire, is formed of resilient wire and return-bent to present diverging side arms 14, the divergent ends of which are bent toward each other, as at 15, one terminal forming the pivotal connection 13, while the other, 16, remains free. The form of the fastening device 12 permits the side arms to be grasped to force the device through the hole D, and the expansion of the said side arms to retain the fastener against accidental displacement.

In use, a pull on the cord A will tend to straighten the coils of the spring 10, and the reaction of the spring will coil up the cord in the same form as the spring. The convolutions of the wire or equivalent elongated element thus receive the flexible cord to hold the cord to the spring while the spring as such maintains the cord in coiled form, presenting convolutions following the convolutions of the spring. Thus the cord is engaged at each of its convolutions by the spring, and a separation of the coils of the cord may be effected by a pull upon the cord, the resiliency of the spring tending to restore the cord to its closer coiled form.

Having thus described my invention, I claim as new and desire to secure by Letters Patent:

1. The combination with a flexible element, of a coiled spring formed of spiral wire, the spiral convolutions of the wire winding about said element, and the convolutions of the spring normally maintaining said element coiled, the convolutions of the coiled spring and element being free to yield and straighten in response to a pulling force.

2. The combination with a flexible element, of a spiral spring formed of a spiral wire, the convolutions of the wire winding about the said element, and the latter following the convolutions of the coils of the spring, said spring being fastened at one end to said element, and having means at the opposite end for connection with a relatively fixed support.

3. A coiling device comprising a coiled spring formed of sinuous wire.

4. A coiling device comprising a coiled spring formed of sinuous wire, one end of said spring having a fastening member consisting of laterally contractible members.

5. A coiling device, comprising a coiled spring having a fastening means pivoted thereto at one end, said means consisting of a wire return-bent and presenting resilient side arms.

6. The combination with a coiled flexible element, of a holding element presenting spiral convolutions winding about the said flexible element, said holding element being formed into a spiral spring.

In testimony whereof I have signed my name to this specification in the presence of two subscribing witnesses.

LORENZO E. HAYNES.

Witnesses:
 JOSEPH E. HAYNES,
 Mrs. E. M. SUTTON.